(12) United States Patent
Stenzel et al.

(10) Patent No.: US 8,998,535 B2
(45) Date of Patent: Apr. 7, 2015

(54) METHOD AND SYSTEM OF RETRIEVER SYSTEMS FOR MARINE GEOPHYSICAL SURVEY SENSOR STREAMERS

(75) Inventors: Andre Stenzel, Sugar Land, TX (US); Youlin Hu, The Woodlands, TX (US); Troy L. McKey, III, La Place, LA (US)

(73) Assignee: PGS Geophysical AS, Oslo (NO)

( * ) Notice: Subject to any disclaimer, the term of this patent is extended or adjusted under 35 U.S.C. 154(b) by 49 days.

(21) Appl. No.: 13/474,935

(22) Filed: May 18, 2012

(65) Prior Publication Data

US 2013/0309017 A1  Nov. 21, 2013

(51) Int. Cl.
| | | |
|---|---|---|
| *F16L 1/24* | (2006.01) | |
| *B63B 21/66* | (2006.01) | |
| *B63B 22/22* | (2006.01) | |
| *B63C 7/10* | (2006.01) | |
| *G01V 1/38* | (2006.01) | |
| *G01V 3/17* | (2006.01) | |

(52) U.S. Cl.
CPC .............. *B63B 21/66* (2013.01); *B63B 22/22* (2013.01); *B63C 7/10* (2013.01); *G01V 1/38* (2013.01); *G01V 3/17* (2013.01); *Y10T 29/49826* (2013.01)

(58) Field of Classification Search
CPC .......... B63B 21/66; B63B 22/22; B63C 7/10; G01V 1/38; G01V 3/17
USPC ....................... 405/158, 171, 173; 367/16, 18; 114/123, 245; 441/2, 9, 92, 133
See application file for complete search history.

(56) References Cited

U.S. PATENT DOCUMENTS

| | | |
|---|---|---|
| 3,909,774 A | 9/1975 | Pavey, Jr. |
| 4,823,325 A | 4/1989 | Cole, Jr. |
| 4,928,262 A | 5/1990 | Neeley et al. |
| 5,076,468 A | 12/1991 | Mackal |
| 5,400,922 A | 3/1995 | Weinheimer et al. |
| 5,404,339 A | 4/1995 | Cole, Jr. |
| 5,509,576 A | 4/1996 | Weinheimer et al. |
| 6,019,652 A | 2/2000 | Nielsen et al. |
| 6,533,627 B1 | 3/2003 | Ambs |
| 6,612,886 B2 | 9/2003 | Cole, Jr. |
| 7,475,711 B2 | 1/2009 | Fawcett, Jr. et al. |
| 2003/0045189 A1 | 3/2003 | Cole, Jr. |
| 2011/0049449 A1 | 3/2011 | Scott |
| 2013/0028046 A1 | 1/2013 | Stenzel et al. |
| 2013/0028663 A1 | 1/2013 | Stenzel et al. |

OTHER PUBLICATIONS

Concord Technologies, LP, SRD-500 Recovery Device, http://www.concordtech.com/prod01.htm, Oct. 29, 2001.
Concord Technologies, LP, Quick Latch Collar Assemblies, http://www.concordtech.com/prod04.htm, Oct. 29, 2001.
Concord Technologies, LP, SRD-1250 Recovery Device, http://www.concordtech.com/prod031.htm, Oct. 29, 2001.
United Kingdom Search Report, mailing date: Sep. 6, 2013.

*Primary Examiner* — Sunil Singh
*Assistant Examiner* — Carib Oquendo

(57) ABSTRACT

Retriever systems for marine geophysical survey sensor streamers. At least some of the illustrative embodiments are methods including attaching a retriever system to a sensor streamer by: wrapping a lifting bag assembly at least partially around the sensor streamer, the lifting bag assembly comprising a deflated lifting bag, a gas cylinder, and a depth trigger mechanism; and covering the lifting bag assembly with an outer cover.

22 Claims, 8 Drawing Sheets

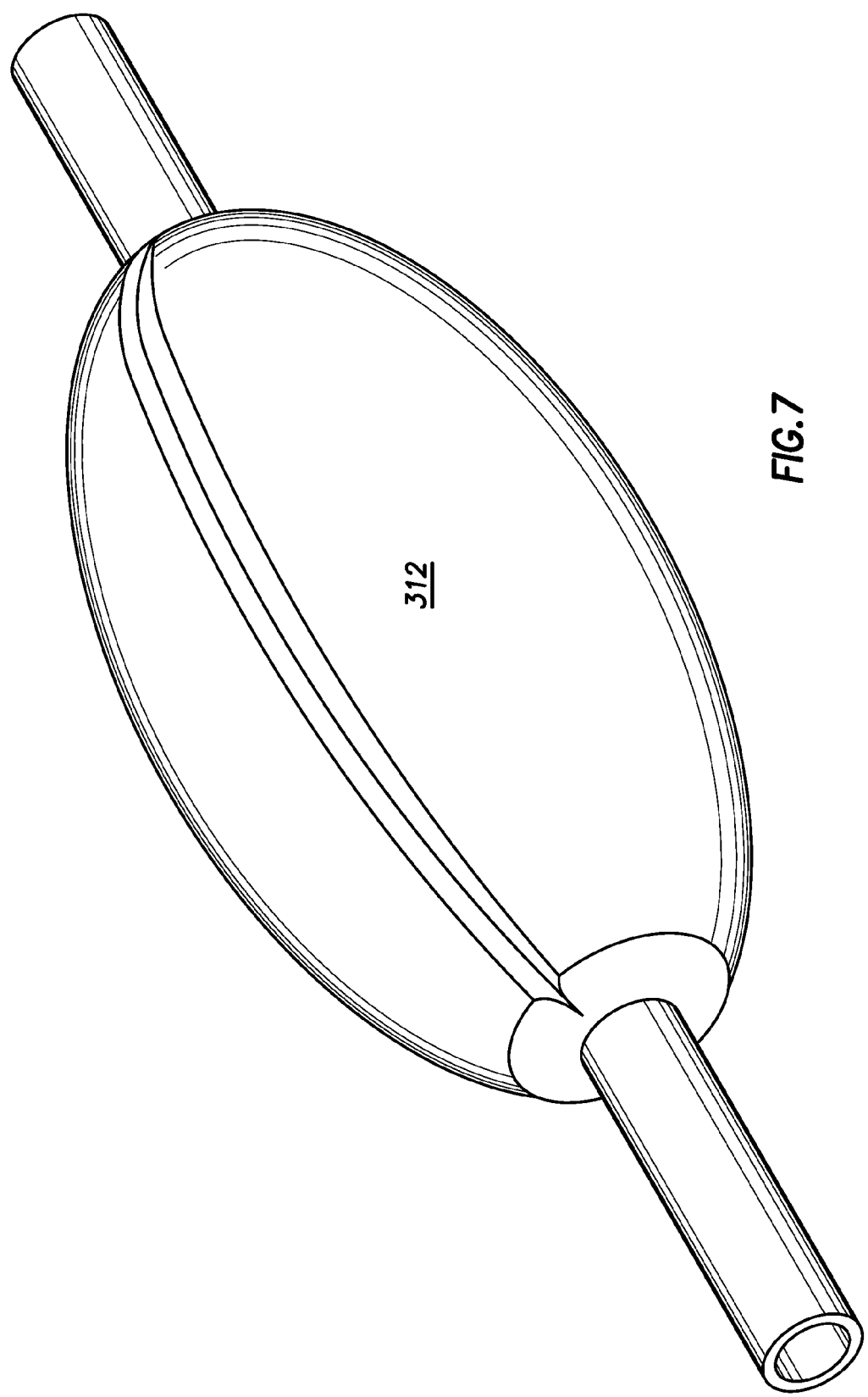

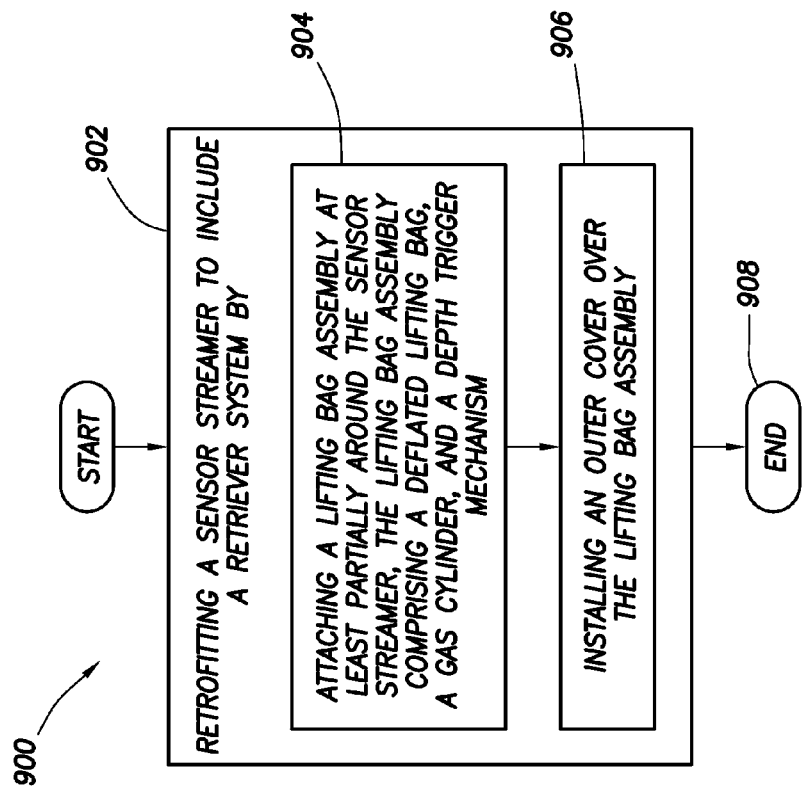
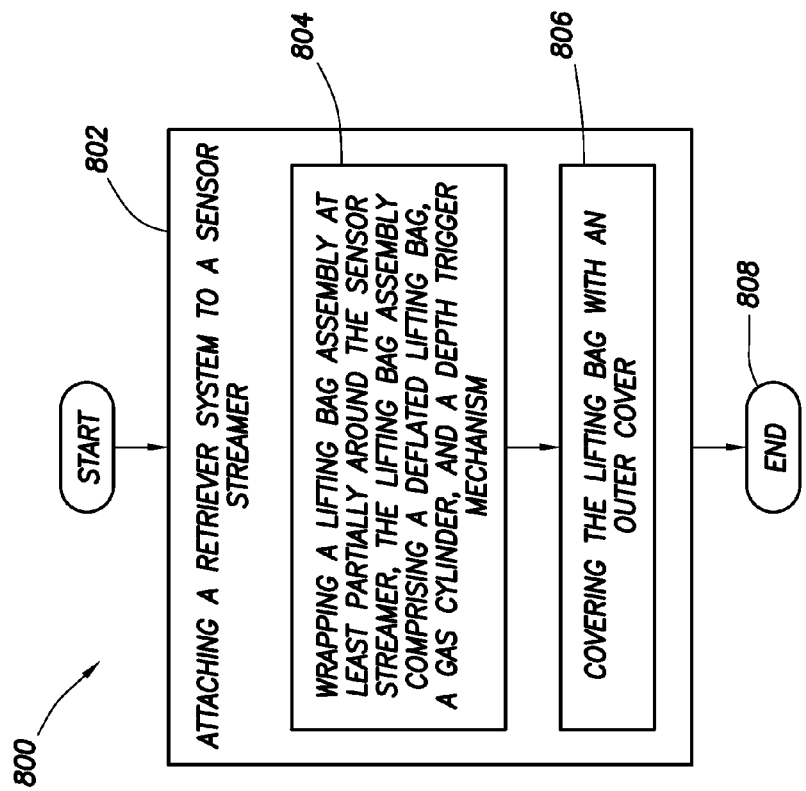

US 8,998,535 B2

METHOD AND SYSTEM OF RETRIEVER SYSTEMS FOR MARINE GEOPHYSICAL SURVEY SENSOR STREAMERS

CROSS-REFERENCE TO RELATED APPLICATIONS

None.

BACKGROUND

Marine survey systems are used to acquire data (e.g., seismic, electromagnetic) regarding Earth formations below a body of water such as a lake or ocean. The marine survey systems typically use a plurality of sensor streamers which contain one or more sensors disposed proximate an outer jacket.

In some situations, one or more sensor streamers may be disconnected from the survey system, the disconnection possibly caused by failure of a coupling mechanism or in some situations the sensor streamer may be severed (e.g., by the propeller of a passing vessel). In some failure scenarios, particularly with sensor streamers filled with alcohol or oil, the sensor streamer becomes negatively buoyant, thus tending to sink. In order to avoid complete loss of the sensor streamer, an inflatable lifting bag system may trigger (i.e., a retriever system), which causes the sensor streamer to surface.

Retriever systems available prior to the current disclosure are large in relation to the size of the sensor streamers. The size makes the retriever systems heavy, creates significant drag, and causes significant turbulence in the water near the sensor streamers. Moreover, each retriever system may be an anchor-point for marine growth, such as barnacles. For example, it is currently believed that marine growth preferentially occurs on irregular external streamer surfaces, possibly due to micro-turbulence at such external surface irregularities during towing operations.

BRIEF DESCRIPTION OF THE DRAWINGS

For a detailed description of exemplary embodiments, reference will now be made to the accompanying drawings in which:

FIG. 7 shows a perspective view of a retriever system with an inflated lifting bag, in accordance with at least some embodiments;

FIG. 8 shows a method in accordance with at least some embodiments; and

FIG. 9 shows a method in accordance with at least some embodiments.

NOTATION AND NOMENCLATURE

Figure 1:
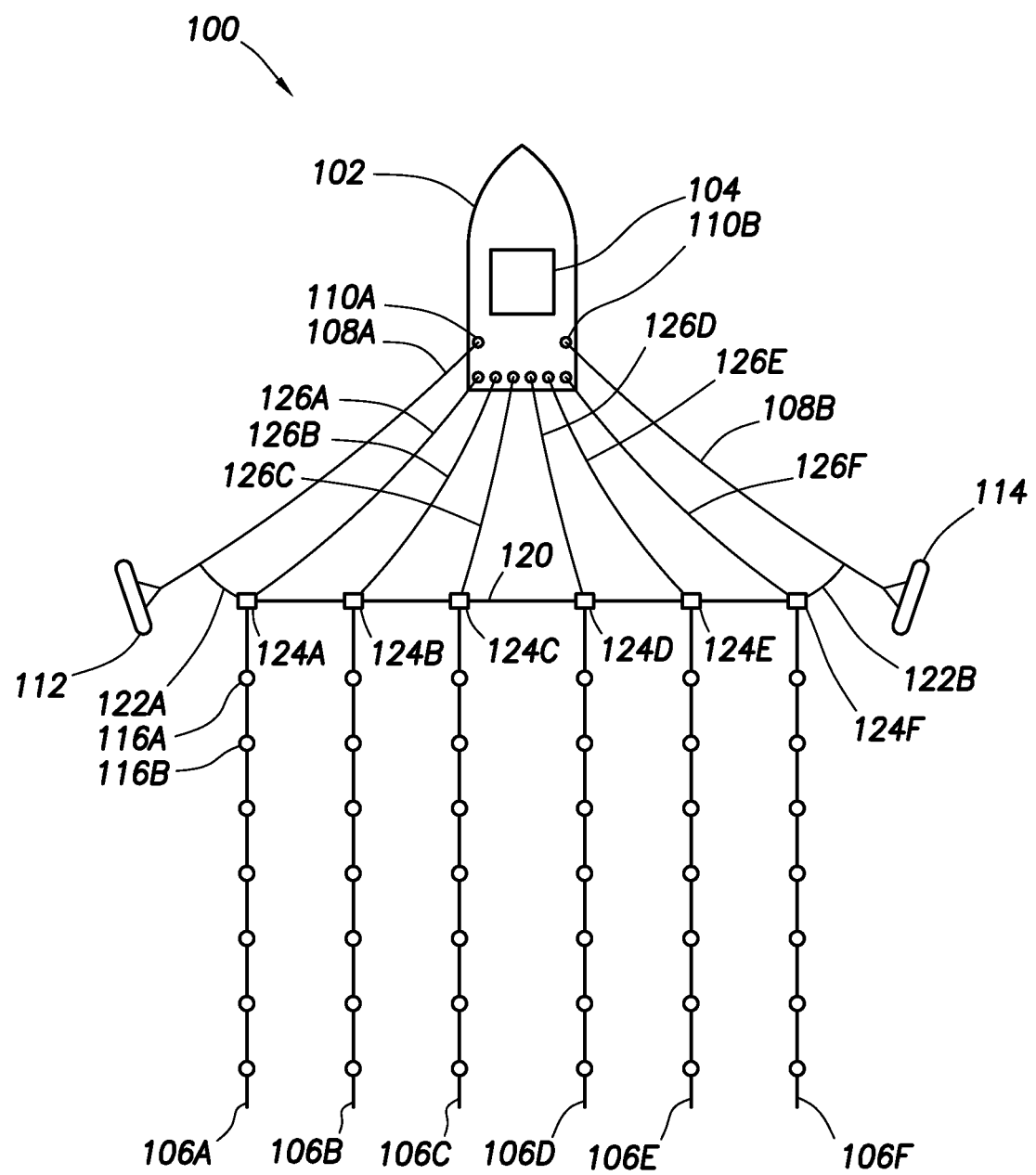
FIG. 1 shows an overhead view of marine survey system in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"About" shall mean plus or minus five percent (5%) of the recited value.

"Gas" in reference to a substance shall refer to the state of the substance at standard atmospheric pressure and temperature. The fact that a substance may be a liquid at certain pressures and/or temperatures shall not obviate the substance's status as a gas.

"Non-triggered" with respect to a depth trigger mechanism or components thereof shall mean that the depth trigger mechanism is armed and has yet to change operational state from the armed condition.

"Triggered" with respect to a depth trigger mechanism or components thereof shall mean that the depth trigger mechanism has changed operational state responsive to reaching or exceeding a predetermined depth.

"Not directly coupled" shall mean that a first object and a second object, if mechanically coupled at all, are mechanically coupled by way of at least one intervening object.

"Central axis" regarding a sensor streamer shall mean an axis of the sensor streamer parallel to the length of the sensor streamer.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Various embodiments are directed to retriever systems for geophysical sensor streamers used in marine surveys. More particularly, at least some embodiments are directed to streamlined lifting bag systems. The specification first turns to an illustrative marine survey system to orient the reader, and then to example embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more streamers 106A-F through the water.

While FIG. 1 illustratively shows six streamers 106, any number of streamers 106 may be used. The discussion continues with respect to streamers 106 being sensor streamers, but streamers 106 are illustrative of any towed geophysical survey cable, such as transmitter cables and source cables.

In the illustrated embodiment, the sensor streamers 106 are coupled to towing equipment that maintains the streamers 106 at selected depth and lateral positions with respect to each other and with respect to the survey vessel 102. The towing equipment may comprise two paravane tow lines 108A and 108B each coupled to the vessel 102 by way of winches 110A and 1108, respectively. The winches enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120, or as illustrated couple to the spreader line by way of spur lines 122A and 122B.

As illustrated, the sensor streamers 106 are each coupled, at the ends nearest the vessel 102 (i.e., the proximal ends), to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the recording system 104 and the sensors (e.g., 116A, 116B) in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed. As would be understood by one of ordinary skill in the art with the benefit of this disclosure, the illustrated towing equipment may be used alone or in conjunction with other lateral position and depth control equipment. Other embodiments may have more complex or simpler towing arrangements.

Figure 2:
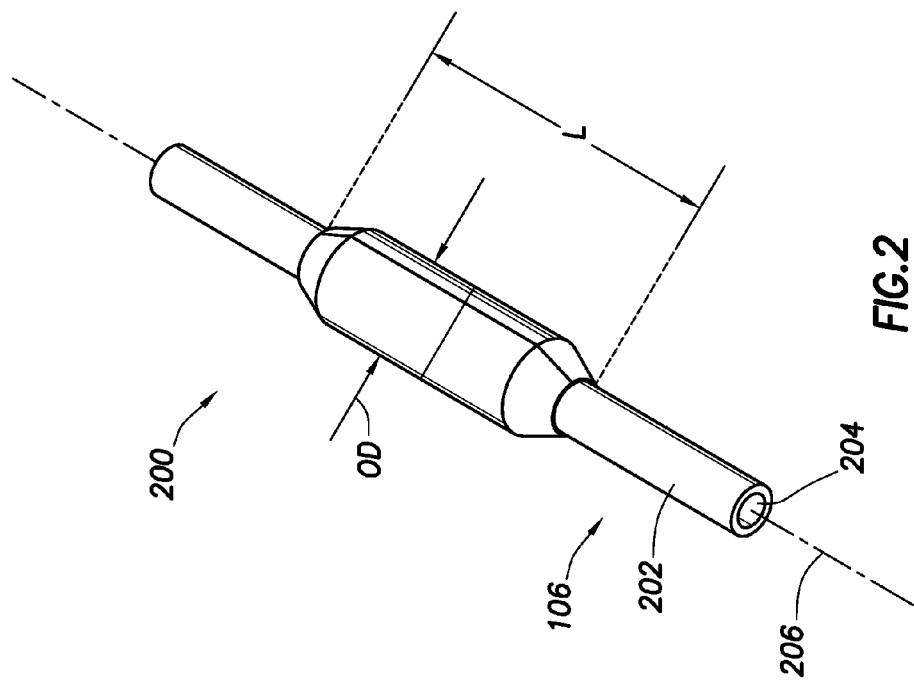
FIG. 2 shows a perspective view of a retriever system in accordance with at least some embodiments.

FIG. 2 shows a perspective view of a retriever system 200 in accordance with at least some embodiments. In particular, FIG. 2 shows a portion of a sensor streamer 106 that comprises an elongated outer jacket 202 defining an interior volume 204. The elongated outer jacket defines a central axis 206 along the long dimension of the sensor streamer 106. Though not specifically shown in FIG. 2, various sensors (e.g., hydrophones, geophones, electromagnetic sensors) associated with the sensor streamer 106 may reside within interior volume 204 or on elongated outer jacket 202 and may be spaced longitudinally along the sensor streamer 106. Likewise, and also not specifically shown, one or more ropes may reside within the sensor streamer 106 (the ropes known as strength members), and may carry the towing force of the sensor streamer 106.

While FIG. 2 only shows one retriever system 200, it will be understood that a sensor streamer may have a length on the order of about 5000 to 15000 meters, and thus a plurality of such retriever systems 200 may be spaced along and thus associated with each sensor streamer 106. In some cases, the retriever systems associated with a sensor streamer may be evenly spaced along the elongated outer jacket, but such even spacing is not strictly required. In some embodiments, a retriever system 200 such as shown in FIG. 2 may be placed every 300 meters or so along a sensor streamer, but closer and longer spacing is also contemplated.

In some situations, the outer jacket 202 has a circular cross-section and an outside diameter of about 6.6 centimeter (cm) (2.6 inches). When the outside diameter (OD) of the outer jacket 202 is about 6.6 cm, the outside diameter of the retriever system 200 in accordance with at least some embodiments is about 8.9 cm (3.5 inches), and the retriever system may have an overall length (L) of about 50.8 cm (20 inches). Thus, in terms of the relationship between the outside diameter of the outer jacket 202 and the outside diameter of the retriever system 200, the retriever system 200 may have an outside diameter no larger than 3.0 times the outside diameter of the outer jacket 202, and more particularly still, the retriever system 200 may have an outside diameter no larger than 1.4 times the outside diameter of the outer jacket 202. The specification now turns to specifics of the retriever system 200.

Figure 3A:
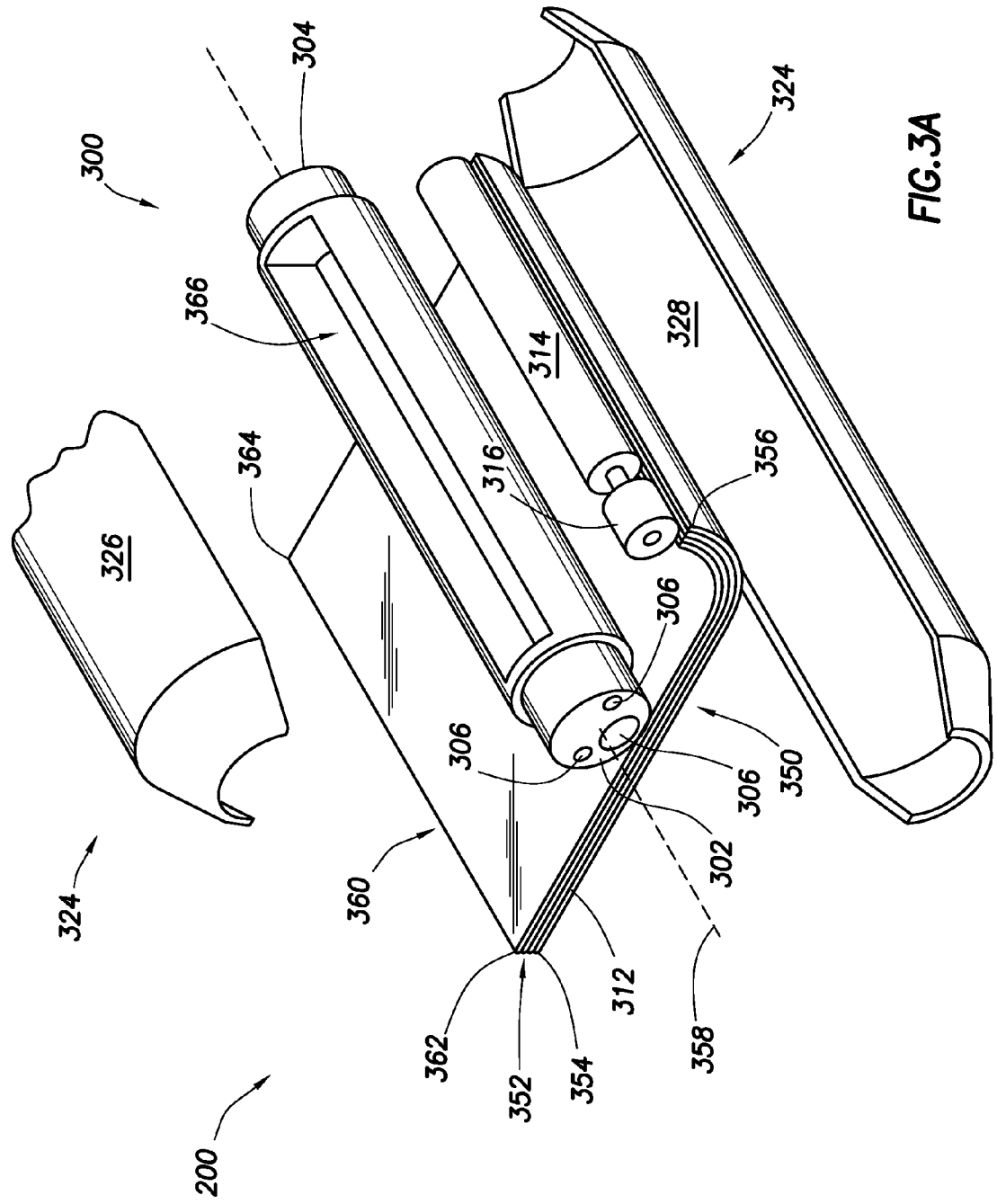
FIG. 3A shows an exploded perspective view of a retriever system in accordance with at least some embodiments.

FIG. 3A shows an exploded perspective view of a retriever system 200 (in a non-deployed condition) in accordance with at least some embodiments. In particular, the illustrative retriever system 200 comprises an optional attachment block 300 that defines a first end 302 and opposite second end 304, both of circular cross-sections. In some embodiments, the attachment block 300 may serve a dual function, such as an attachment location for a retriever system or the attachment location for other streamer equipment, such as a ballast weights. The attachment block 300 defines a plurality of passages or conduits 306 that extend between the first end 302 and the second end 304 of the attachment block. It is through the conduits 306 that strength members (e.g., ropes), as well as various electrical and/or communicative conductors of the sensor streamer 106, pass such that power may be provided to the sensors and/or readings taken from the sensors along the sensor streamer 106. The relationship between forces carried by the strength members and the attachment block 300 is discussed more below. The first end 302 and second end 304 define an outside diameter sized to couple to an inside diameter of the elongated outer jacket 202 of the sensor streamer 106. In some cases, the first end 302 and second end 304 may comprise a plurality of grooves (not specifically shown) to assist in the coupling of the ends 302 and 304 to the elongated outer jacket 202. The grooves may take any suitable form, such as rectangular grooves, triangular grooves, or grooves similar to threads, just to name a few. The attachment block 300 (including the ends 302 and 304) may be made from any suitable material keeping in mind that the buoyancy of the sensor streamer (with the lifting bag system in a non-deployed state) is designed to be approximately neutrally buoyant. Thus, the bag attachment block 300 may be made from materials such as high density plastic, or light metals such as titanium or aluminum. Other materials, and combinations of materials, may be also be used.

The retriever system 200 further comprises a lifting bag 312. FIG. 3A shows the retriever system 200 with the lifting bag 312 in a deflated and folded state. When deflated and stowed the lifting bag 312 is folded such the amount of space used to store the bag within the retriever system 200 is reduced. The lifting bag 312 in its inflated state may take any suitable shape, such as round, or rectangular. When deployed, the lifting bag itself may mechanically couple to the attachment block 300 or outer jacket 202 and support the weight of the sensor streamer. The material from which the lifting bag 312 is constructed may take any suitable form. In some cases, the lifting bag 312 material may be a plastic material, plastic coated fabric, rubber, rubber coated fabric, or water tight or water resistant material. The bag may also be elastically or plastically expandable.

In order to inflate the lifting bag 312 when needed, the retriever system 200 further comprises gas cylinder 314 coupled to a depth trigger mechanism 316. The gas cylinder 314 comprises a compressed gas that, when selectively released by depth trigger mechanism 316, inflates the lifting bag 312. The compressed gas within the cylinder 314 may take any suitable form, such as compressed air, compressed nitrogen, compressed carbon dioxide, or other gas. In at least some embodiments, the compressed gas is held at a pressure and temperature where the gas becomes a liquid. More particularly, in some embodiments the compressed gas in the cylinder 314 is liquid carbon dioxide. In a particular embodiment, the cylinder 314 holds about 85 grams of liquid carbon dioxide. In order to hold the illustrative 85 grams of liquid carbon dioxide, a cylinder having dimensions of about 3.5 cm (1.4 inches) in diameter and about 19.6 cm (7.7 inches) in length may be used. Other sizes may also be used based on the weight of carbon dioxide held in the cylinder 314 for a different lifting force.

The retriever system 200 further comprises depth trigger mechanism 316. When the depth of the retriever system 200 meets or exceeds a predetermined depth (e.g., 60 meters), the depth trigger mechanism 316 transitions from a non-triggered state to a triggered state and fluidly couples the compressed gas from the gas cylinder 314 to the internal volume of the lifting bag 312 such that the lifting bag 312 inflates. Any of a variety of depth trigger mechanisms may be implemented, such as depth triggers discussed in the commonly owned and co-pending U.S. patent application Ser. No. 13/438,583 titled "Method and system of retriever systems for marine geophysical survey cables," the disclosure of which is incorporated by reference herein as if reproduced in full below.

Still referring to FIG. 3A, the retriever system 200 further comprises outer cover 324. In some embodiments, the outer cover 324 may be a single frangible unit designed and constructed to break away as the lifting bag 312 begins to inflate. Certain embodiments include an outer cover 324 designed with minimal external surface irregularities, which may help to reduce marine growth on such external surfaces. Illustrative outer cover 324 is shown to comprise two portions 326 and 328. Only a portion of the upper half 326 is visible in the exploded view of FIG. 3. The illustrative portions 326 and 328 couple to each other and are designed and constructed to separate from each other and/or to break apart as the lifting bag 312 begins to inflate. The outer cover 324 may also be a single cover which opens along a single joint seam once the lifting bag 312 begin to inflate inside. The outer cover 324 may be made of any suitable material, such as a plastic material (e.g., polyurethane) having a durometer rating of 90-95. Other types of materials, and other durometer ratings, may also be used. In some embodiments, the outer cover 324 is impregnated with an anti-fouling coating, which may reduce marine growth such as barnacles. In yet still further embodiments, the outer cover may be impregnated with buoyant microspheres to help control buoyancy of the overall retriever system 200.

Various embodiments of the retriever system 200 are designed and constructed to reduce the effort needed to attach a retriever system 200 and later, if needed, remove the retriever system 200. To that end, the lifting bag 312, gas cylinder 314, and depth trigger mechanism 316 are an integrated unit termed herein a lifting bag assembly 350. The overall retriever system 200 may be assembly onto a sensor streamer by wrapping the lifting bag assembly 350 around the sensor streamer, and then covering the lifting bag assembly 350 with the outer cover 324. In particular, in the illustrative embodiment of FIG. 3, a first edge 352 of the lifting bag 312 (the illustrative first edge being the shortest distance along the lifting bag spanning from point 354 to the point 356) is wrapped around an attachment location, the attachment location in this illustrative case being the attachment block 300. If the first edge 352 forms a straight line, then the wrapped edge 352 defines a plane that is substantially perpendicular to the central axis 358 of the attachment block 300. It is noted that the central axis 358 of the attachment block 300 is coaxial with the central axis 206 of the outer jacket 202, and thus, equivalently when wrapped the edge 352 defines a plane that is substantially perpendicular to the central axis 206 of the outer jacket 202.

Although to some extent wrapping the first edge 352 of the lifting bag assembly 350 around the sensor streamer may also align other portions of the lifting bag 312, for completeness it may also be stated that a second edge 360 of the lifting bag 312 (the illustrative second edge being the shortest distance along the lifting bag spanning from point 362 to the point 364) is aligned with the central axis 358 of the attachment block 300. In the case of the second edge 360 forming a straight line, the second edge 360 may be parallel to the central axis 358 of the attachment block 300 (and/or parallel to the central axis 206 of the outer jacket 202).

Figure 3B:
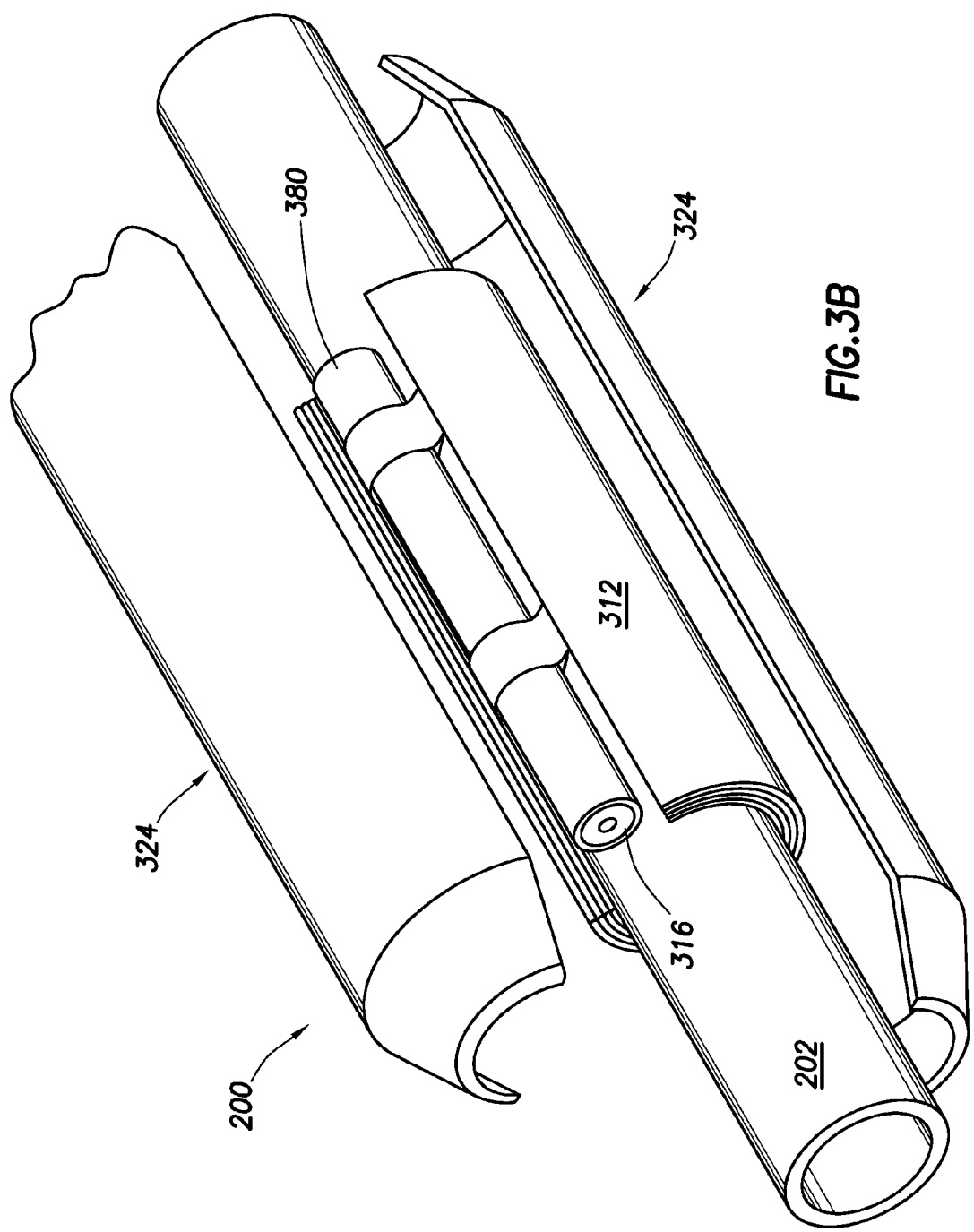
FIG. 3B shows an exploded perspective view of a retriever system in accordance with at least some embodiments.

In some embodiments the lifting bag assembly 350 and outer cover 324 may be attached directly over the outer jacket 202 of the sensor streamer, as shown in FIG. 3B, and thus an attachment block 300 is not strictly required. In particular, FIG. 3B shows a perspective exploded view of the retriever system 200 attaching directly over the outer jacket 202. In these embodiments, the gas cylinder and depth trigger mechanism abut the outer surface of the outer jacket 202. Likewise, the lifting bag 312 likewise directly abuts the outer surface of the outer jacket 202. Illustratively, the depth trigger mechanism and gas cylinder may be telescoped within a protective cover or tubing 380 (e.g., steel, aluminum, plastic) that defines an inside dimension (such as a circular inside dimension). The cover 380 may be used to protect the trigger mechanism 316 and/or gas cylinder (not visible in FIG. 3B) from damage, such as when the retriever 200 is reeled along with the sensor streamer onto a reel for storage. Although the cover is shown in with respect to FIG. 3B and thus embodiments where the retriever system 200 is used without an attachment block, the cover 380 may likewise be used in any of the embodiments discussed in this specification. Attaching directly over the outer jacket 202 may enable retrofitting of existing streamers and/or streamers that do not contain attachment blocks.

Referring again to FIG. 3A, in cases where an attachment block 300 is provided, an overall outside diameter of the outer cover 324 may be reduced by use of a trough 366 formed within the attachment block 300. In particular, illustrative attachment block 300 has formed therein a groove or trough 366 that defines a length along the central axis 358 of the attachment block 300 between the ends 302 and 304, and a depth. In order to seal the inside diameter of the outer jacket from sea water intrusion, the conduits 306 do not intersect the trough 366. The length and depth of the trough 366 may be selected such that the cylinder 314 and trigger mechanism 316 (though coupled to the lifting bag 312) may reside at least partially within the trough 366 when the lifting bag 312 is wrapped around the attachment block 300. Stated otherwise, in some embodiments wrapping the overall lifting bag assembly 350 around the attachment block 300 may involve placing the cylinder 314 and depth trigger mechanism 316 into the trough 366 (i.e., placed into an abutting relationship with the trough) either before, after, or during the wrapping of the lifting bag 312 around the attachment block 300. In some embodiments, the cylinder 314 and depth trigger mechanism 316 are directly coupled to the lifting bag 312, and merely placed within the trough 366 such that the cylinder 314 and depth trigger mechanism 316 are not directly coupled to the attachment block. In fact, and as will be discussed more below, in some cases inflation of the lifting bag 312 dislodges the gas cylinder 314 and depth trigger mechanism 316 from the trough 366.

Figure 4:
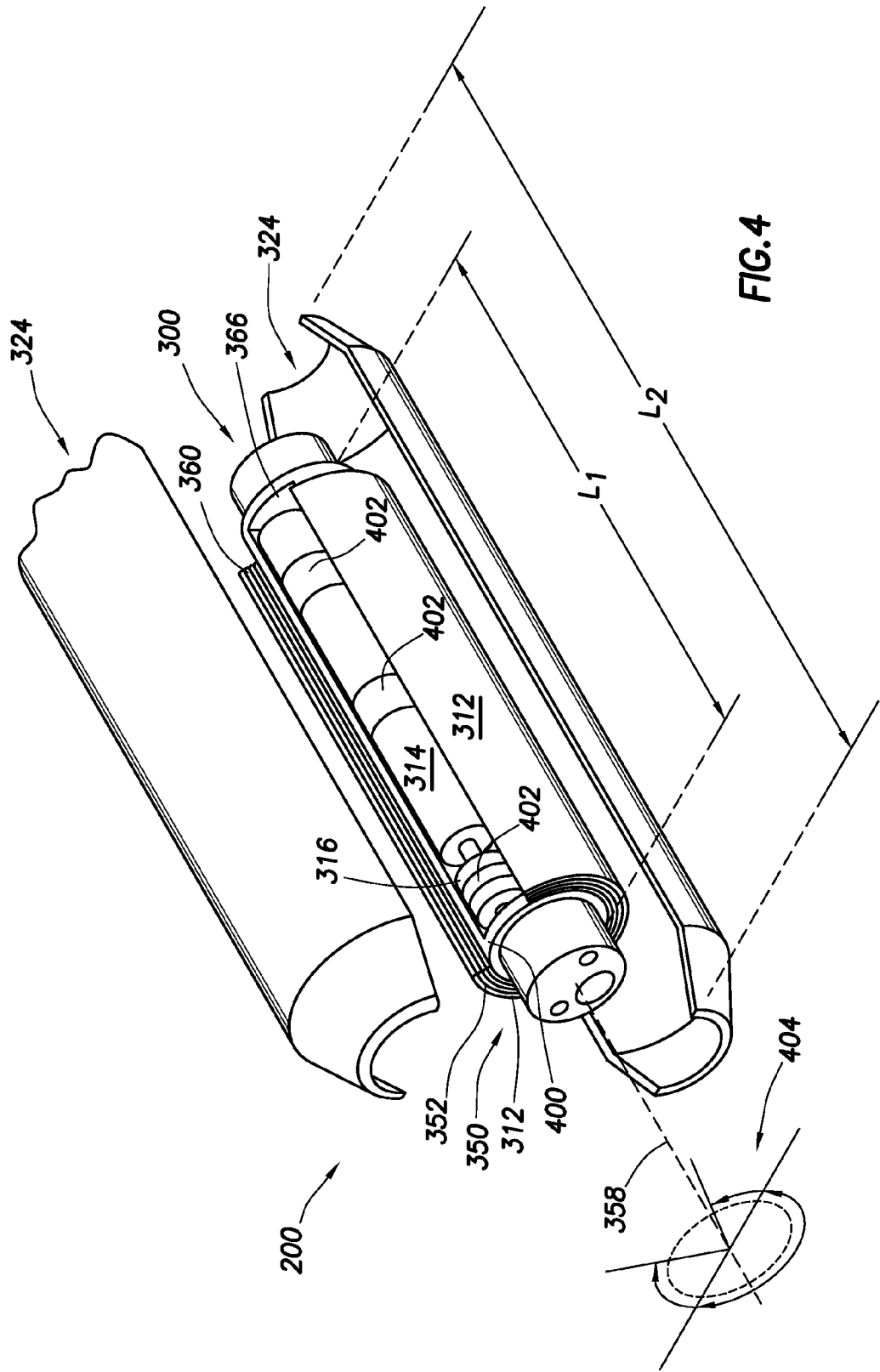
FIG. 4 shows an exploded perspective view of a retriever system in accordance with at least some embodiments.

FIG. 4 shows an exploded perspective view of the retriever system 200, but in the case of FIG. 4 the lifting bag assembly 350 is shown in operational wrapped around the attachment block 300. In particular, in FIG. 4 the lifting bag 312 in a deflated state is shown abutting an outer surface 400 of the attachment block 300. The first edge 352 at least partially circumscribes the outer surface 400 of the attachment block (i.e., the bag attachment location), and the second edge 360 is at least partially aligned with the central axis of the attachment block 300. The length of the lifting bag may be longer or shorter than the length of the attachment block 300. Moreover, FIG. 4 shows the gas cylinder 314 and depth trigger mechanism 316 coupled to the lifting bag 312, illustratively by way of a plurality of straps 402. Other mechanisms to couple the gas cylinder 314 and depth trigger 316 to the lifting bag 312 may also be used, such as by placing the gas cylinder 314 and depth trigger within a pocket constructed of flexible material. Further still, the fluidic coupling between the depth trigger mechanism 316 and the interior volume of the lifting bag may provide the mechanical coupling.

FIG. 4 also shows that, in some embodiments, the circumferential distance that the lifting bag spans around the attachment location may be more than half the circumference of the sensor streamer. In particular, FIG. 4 shows in perspective view a compass face 404 aligned with the central axis 358 of the attachment block 300. The illustrative compass face 404 shows that the circumferential distance spanned by the first edge 352 of the lifting bag 312 is more than half the circumference of the attachment block 300 (and thus more than half the circumference of the sensor streamer) and, as shown, approximately 270 degrees or more. In some cases, discussed more below, the lifting bag 312 spans the entire circumference.

FIG. 4 also shows that, in at least some embodiments, the gas cylinder 314 and depth trigger mechanism 316 reside within the trough 366 defined by the attachment block. In some cases, the relationship between the size of the gas cylinder 314 and depth trigger mechanism 316 on the one hand, and the depth of the trough 366 on the other hand, are such that the gas cylinder 314 and depth trigger mechanism 316 reside fully within the trough (i.e., if the outer surface 400 was theoretically extended over the surface of the trough 366, the gas cylinder 314 and depth trigger mechanism 316 would reside below the extended outer surface). In other embodiments, and as illustrated in FIG. 4, the gas cylinder 314 and depth trigger 316 may protrude from the trough, thus adding to the overall outside diameter of the retriever system 200. In some embodiments, a tubing or equivalent part may be used on the outside of gas cylinder and trigger mechanism to protect them from damage, such as, caused by reeling.

Before proceeding, a few additional points are in order. FIGS. 3 and 4 shows the edges 352 and 360 (and other unnumbered edges) as pleated or folded edges; however, the edges are merely illustrative, and any particular edge of the lifting bag need not be pleated or folded, nor even have a seam at the edge. Thus, the first edge 312 that circumscribes the attachment block 300 may be merely a fold in the material of the lifting bag 312, or a seam where two pieces of lifting bag material are coupled (e.g., such as by sewing, or adhesive). Likewise, second edge 360 may merely be a fold in the material of the lifting bag 312, or a seam where two pieces of lifting bag material are coupled (e.g., such as by folding). Moreover, while FIGS. 3 and 4 show each edge as straight, straight edges are not strictly required. For example, in some cases (discussed more below), the lifting bag 312 when inflated may define a shape of a balloon (e.g., a shape similar to an inflated hot air balloon), and thus in the deflated and folded state no edge may define a straight line. Given that there may not be a straight, edges of folded bag do not need to align with edges of a mounting block. A bag may extend beyond or be shorter than a mounting block, depending on desired flotation capacity-volume of a float at atmospheric pressure.

As for the relationship between the attachment block 300 and the outer cover 324, and referring again to FIG. 4, in some embodiments the attachment block 300 defines an axial length (L1) of about 30.5 cm (12 inches), and the outer cover 324 may have about the same axial length. In other cases, the axial length (L2) of the outer cover 324 may be longer than the axial length of the attachment block 300. In one embodiment, with an attachment block with an axial length of about 30.5 cm, the outer cover 324 may have an axial length of about 50.8 cm (20 inches). It follows that that axial length of the lifting bag when wrapped need not be coextensive with the axial length of the attachment block. That is, in some embodiments, portions of the lifting bag may circumscribe the outer jacket 202 (not shown in FIG. 4), and other portions of the lifting bag may circumscribe the attachment block 300, yet the gas cylinder 314 and depth trigger mechanism 316 still reside within the trough 366 and all still covered by the outer cover 324.

The length L1 of the attachment block 300 may be considered a "hard length" as the attachment block 300 (and gas cylinder 314, etc.) may not be particularly flexible. On the other hand, the length L2 may be considered a "soft length" such that the outer cover 324 and lifting bag 312 (in cases where the stowed lifting bag extends beyond the attachment block 300) may be flexible to enable deformation, such as to deform when the sensor streamer including the retriever system 200 is rolled up on a reel. Thus, in these embodiments the "hard length" may be limited to the length L1 of the attachment block 300, the "soft length" L2 may be greater than the "hard length", thus enabling the retriever system 200 to be rolled up on a reel rather than requiring removal after each use.

Figure 5:
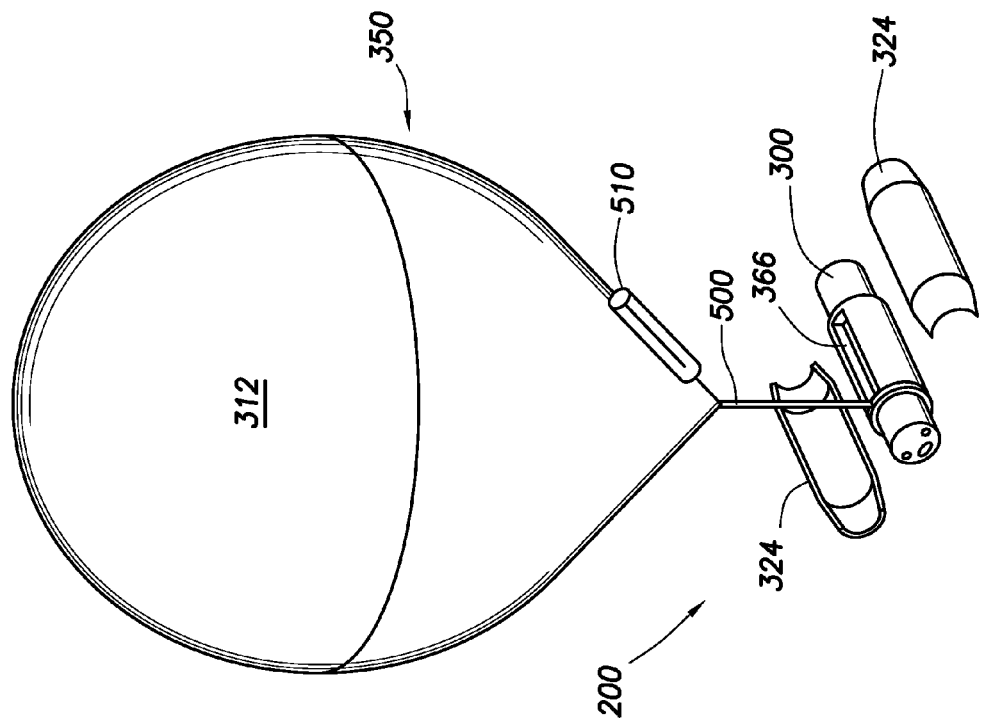
FIG. 5 shows a perspective view of a retriever system with an inflated lifting bag, in accordance with at least some embodiments.

FIG. 5 shows a perspective view of an illustrative retriever system 200 in a triggered or deployed condition. In particular, FIG. 5 shows lifting bag 312 in the form of a balloon and in an inflated state. The illustrative lifting bag 312 couples to the attachment block 300 (and thus the sensor streamer) by way of a rope or tether 500. A first end of the tether 500 couples to the lifting bag 312, and a second end of the tether 500 illustratively couples to the attachment block 300. Thus, in embodiments using a tether 500, one step in coupling the lifting bag assembly to the attachment location may include coupling the tether such that the lifting bag supports the sensor streamer by way of the tether 500 when the lifting bag 312 is inflated. Any suitable mechanism may be used to couple the tether 500 to the sensor streamer (e.g., wrapping the tether around the attachment point and coupling the tether back to itself; coupling the tether to a dedicated attachment point, such as an eyelet, on the attachment block 300). When the illustrative retriever system 300 of FIG. 5 is in the non-triggered state, the tether 500, along with the other components of the lifting bag assembly 350, may be contained within and/or covered by the outer cover 324.

FIG. 5 also shows an illustrative relationship of the gas cylinder and depth trigger mechanism in the inflated state. In particular, in some embodiments the gas cylinder and depth trigger mechanism (along with their protective tubing or the like) reside at least partially within the trough 366 when the lifting bag is in the non-inflated state. However, as shown in FIG. 5, gas cylinder and depth trigger mechanism may be coupled to the lifting bag 312 in such a way as to be dislodged from the trough 366 when the lifting bag is in the inflated state. FIG. 5 shows a pocket or sleeve 510 coupled to the lifting bag 312. The gas cylinder and depth trigger mechanism may be placed within the sleeve 510 as part of constructing of the lifting bag assembly 350. When the lifting bag 312 inflates and rises as shown, the sleeve 510 may move in relation to the trough 366. A sleeve 510 is merely illustrative mechanisms by which the gas cylinder and depth trigger mechanism may couple to the lifting bag 312. The gas cylinder and depth trigger mechanism need not be fully encased by the coupling mechanism (e.g., straps 402 shown in FIG. 4).

Figure 6:
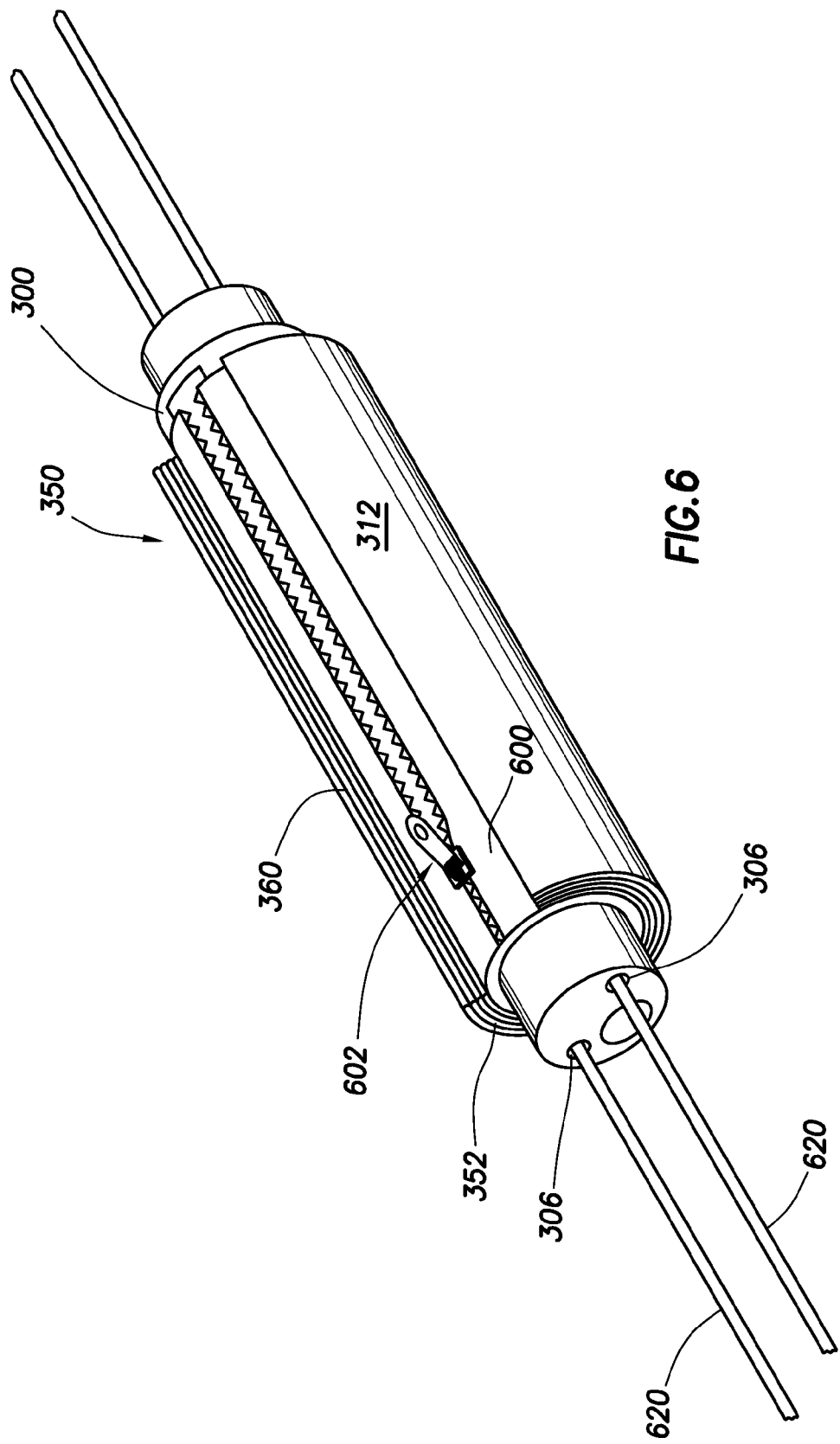
FIG. 6 shows a perspective view of a retriever system in accordance with at least some embodiments.

FIG. 6 shows a perspective view of a portion of retriever system 200 in accordance with yet still further embodiments. In particular, FIG. 6 shows a lifting bag assembly 350 comprising a lifting bag 312, but so as not to unduly complicate the figure the outer cover is not shown. The lifting bag assembly 350 likewise comprises a gas cylinder and depth trigger mechanism, but the gas cylinder and depth trigger mechanism are not visible in FIG. 6. The lifting bag 312 defines first edge 352 that circumscribes the attachment block 300, and second edge 360 that is at least partially aligned with the central axis of the attachment block. The lifting bag 312 in the illustrative embodiment of FIG. 6 further defines a third edge 600, where the second edge 360 and third edge 600 are parallel, and the second edge 360 selectively couples to the third edge 600. That is, in attaching the illustrative lifting bag assembly 350 to the attachment block 300, the first edge 352 of the lifting bag 312 is wrapped around the attachment block 300, and then the second edge 360 is coupled to the third edge 600. Thus, the lifting bag 312 mechanically couples to the sensor streamer by mechanically coupling to itself, and it follows that in the illustrative embodiments of FIG. 6 the tether between the sensor streamer and the lifting bag 312 may be omitted.

The lifting bag 312 may couple to itself along the edges using any suitable fastener or fastening system. In the illustrative embodiment of FIG. 6, a zipper assembly 602 (e.g., plastic zipper to reduce fouling) may be used to fasten the two edges 360 and 600, and yet may enable quick removal of the lifting bag assembly 350. The zipper assembly is merely illustrative. Any suitable fastening system may be used. For example, a plurality of eyelets along one edge, and a corresponding plurality of hooks along the second edge, may be used. In other cases, the fastening system need not have the ability to be easily disconnected, and thus a fastening system such as rivets extending between the edges to hold the edges in an abutting relationship may be used.

Having the lifting bag 312 couple to itself enables alternate inflated shapes for the lifting bag. FIG. 7 shows an illustrative inflated state of a lifting bag 312, in which lifting bag 312 may have the deflated state as shown in FIG. 6. In particular, illustrative lifting bag 312 defines a torus shape when the lifting bag 312 is in the inflated state. It is noted that the axial length of an inflated lifting bag 312 may be greater than the axial length in the deflated state, and/or may be greater than the axial length of the attachment block which the lifting bag abuts. The illustrative torus shape may reduce the likelihood of the lifting bag 312 of catching or snagging other ropes, lines, and/or sea debris as the sensor streamer rises to the surface. Other inflated shapes may also be used. The gas cylinder and depth trigger mechanism, which are not visible in FIGS. 6 and 7, may remain in an abutting relationship against the attachment location abutting the lifting bag assembly when the lifting bag 312 is in the inflated stated. In embodiments where the attachment location is defined by an attachment block, the gas cylinder and depth trigger mechanism may remain in an abutting relationship with the attachment block. In embodiments where the attachment location is defined by an attachment block that defines a trough, the gas cylinder and depth trigger mechanism may remain in an abutting relationship with the trough of the attachment block.

Returning to FIG. 6, the illustrative attachment block 300 defines conduits 306 that extend from the first end 302 to the second end 304. Sensor streamers within which an attachment block 300 may be used may comprise one or more ropes as strength members 620. In accordance with various embodiments, the strength members 620 extend through the conduits 306 of the attachment block 300. Sensor streamers are designed such that towing force for the sensor streamer (e.g., between 4000 and 10000 pounds of force) is carried on the strength members 620, and not the outer jacket or communication cables within the outer jacket. In accordance with various embodiments, the attachment block 300 likewise carries no towing force that resides on the strength members 620. That is, while the strength members 620 pass through the conduits 306, no towing force is passed to or carried by the attachment block 300 based on the relationship. Stated otherwise, while the attachment block 300 is held in a substantially fixed position relative to the strength members 620 by the outer jacket, relatively movement as between the strength members 620 and the attachment block 300 is not prevented by the relationship between the conduits and strength members 620 running through the conduits.

In embodiments that utilize an attachment block 300, each attachment block 300 may be installed within the sensor streamer 300 when the sensor streamer is initially assembled. That is, the attachment block 300 will have the strength members 620 run through the conduits 306, along with communication cables (not specifically shown). The attachment block 300 will likewise have its ends couple to the outer jacket of the sensor streamer. To the extent a survey company elects to use a retriever system in accordance with the various embodiments disclosed herein, the lifting bag assembly 350 and outer cover 324 may be coupled to the attachment block later in time than when the attachment block is coupled within the sensor streamer. In some cases, each lifting bag assembly 350 and outer cover 324 may be installed as the sensor streamer is being fed off a reel into the water. While in some cases the outer cover and lifting bag assembly may be removed as the sensor streamer is rolled back onto a reel for storage after use (e.g., embodiments where no attachment block is used), in other cases the lifting bag 350 and outer cover 324 may be left in place and rolled onto the reel during the process of removal of the sensor streamer from the water.

FIG. 8 shows a method in accordance with at least some embodiments. In particular, the method starts (block 800) and proceeds to attaching a retriever system to a sensor streamer (block 802). Attaching the retriever system may comprise wrapping a lifting bag assembly at least partially around the sensor streamer, the lifting bag assembly comprising a deflated lifting bag, a gas cylinder, and a depth trigger mechanism (block 804). The wrapping may be around a random location on an outer jacket of the sensor streamer, or at a designated location, such as an attachment block. After wrapping the lifting bag assembly, the lifting bag may be attached to the sensor streamer, such as by a tether, or by the lifting bag coupling to itself. After wrapping, the method may comprise covering the lifting bag with an outer cover (block 806). The cover may be a single piece cover, or multiple pieces that attach together to form the outer cover. Thereafter, method ends (block 808).

FIG. 9 shows a method in accordance with at least some embodiments. In particular, the method starts (block 900) and proceeds to retrofitting a sensor streamer to include a retriever system (block 902). The retrofitting may include: attaching a lifting bag assembly at least partially around the sensor streamer, the lifting bag assembly comprising a deflated lifting bag, a gas cylinder, and a depth trigger mechanism (block 904); and installing an outer cover over the lifting bag assembly (block 906). Thereafter, the method ends (block 908).

References to "one embodiment", "an embodiment", "a particular embodiment", "an example embodiment" and "some embodiments" indicate that a particular element or characteristic is included in at least one embodiment of the invention. Although the phrases "one embodiment", "an embodiment", "a particular embodiment", "an example embodiment" and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

We claim:

1. A method comprising:
    attaching a retriever system to a sensor streamer by
        wrapping a lifting bag assembly at least partially around the sensor streamer, the lifting bag assembly comprising a deflated lifting bag, a gas cylinder, and a depth trigger mechanism; and
        covering the lifting bag assembly with an outer cover.

2. The method of claim 1 wherein wrapping further comprises:
    placing a first edge of the lifting bag circumferentially around the sensor streamer such that the first edge spans more than half the circumference of the sensor streamer; and
    aligning a second edge of the lifting bag with a central axis of the sensor streamer.

3. The method of claim 1 wherein wrapping further comprises wrapping the lifting bag around an attachment block coupled to an outer jacket of the sensor streamer, and wherein the attachment block carries no towing force residing on strength members within the sensor streamer.

4. The method of claim 1 wherein wrapping further comprises wrapping the lifting bag around an attachment block and placing the gas cylinder within a trough defined within the attachment block.

5. The method of claim 1 wherein attaching further comprises mechanically coupling a first edge of the lifting bag to a second edge of the lifting bag after the lifting bag assembly is wrapped around the sensor streamer.

6. The method of claim 1 wherein attaching further comprises:
    coupling a first end of a tether to the sensor streamer, and a second end of the tether coupled to the lifting bag; and
    wherein covering the lifting bag further comprises covering the tether.

7. The method of claim 1 wherein covering further comprising at least one selected from the group consisting of: coupling the outer cover around the lifting bag, the outer cover comprising single piece that latches to itself; coupling a plurality of cover sections together around the sensor streamer to create the outer cover.

8. A system comprising:
    a lifting bag in a deflated state abutting an outer surface of a bag attachment location on a geophysical survey cable, the lifting bag defines a first edge that at least partially circumscribes an outer surface at the bag attachment location, and the lifting bag defines a second edge at least partially aligned with a central axis of the geophysical survey cable;
    a gas cylinder coupled to a depth trigger mechanism mechanically coupled to the lifting bag, the gas cylinder and depth trigger abutting the bag attachment location, and the gas cylinder and trigger mechanism not directly coupled to the bag attachment location; and
    an outer cover defining a length and outer surface, the outer cover circumscribing lifting bag, gas cylinder and depth trigger mechanism, and the bag attachment location.

9. The system of claim 8 further comprising a bag attachment block defining two ends, at least one end configured to couple to an outer jacket of the geophysical survey cable, the bag attachment block defining the bag attachment location.

10. The system of claim 9 wherein the bag attachment block defines a trough between the two ends, and wherein the gas cylinder and depth trigger reside at least partially within the trough when the lifting bag is in the deflated state.

11. The system of claim 10 wherein the gas cylinder couples to the lifting bag such that, when the lifting bag is in an inflated state, the gas cylinder and depth trigger reside outside the trough.

12. The system of claim 9:
    wherein the bag attachment block further comprises a conduit extending from the first end to the second end, the conduit defines a central axis parallel to central axis of the geophysical survey cable; and
    the bag attachment block is configured such that a strength member of the geophysical survey cable extending through the conduit imparts no towing force directly to the bag attachment block.

13. The system of claim 8 further comprising a tether coupled on a first end to the bag attachment location, and coupled on a second end to the lifting bag.

14. The system of claim 13 wherein the gas cylinder couples to the lifting bag such that, when the lifting bag in an inflated state, the gas cylinder and depth trigger are dislodged from the abutting relationship against the bag attachment location.

15. The system of claim 8 wherein the lifting bag further comprises:
    a third edge at least partially aligned with the central axis of the geophysical survey cable; and
    the second edge fastened to the third edge.

16. The system of claim 15 wherein the gas cylinder couples to the lifting bag such that, when the lifting bag in an inflated state, the gas cylinder and depth trigger mechanism remain in the abutting relationship against the bag attachment location.

17. The system of claim 8 wherein the outer surface of the outer cover defines a circular cylinder having a diameter no larger than 3.0 times a diameter of an outer jacket of the geophysical survey cable.

18. The system of claim 17 wherein the diameter of the outer cover is no larger than 1.4 times the diameter of the outer jacket of the geophysical survey cable.

19. A method comprising:
   retrofitting a sensor streamer to include a retriever system by
   attaching a lifting bag assembly at least partially around the sensor streamer, the lifting bag assembly comprising a deflated lifting bag, a gas cylinder, and a depth trigger mechanism; and
   installing an outer cover over the lifting bag assembly.

20. The method of claim 19 wherein attaching further comprises attaching the lifting bag around an attachment block coupled to an outer jacket of the sensor streamer, and wherein the attachment block carries no towing force residing on strength members within the sensor streamer.

21. The method of claim 19 wherein attaching further comprises tethering the lifting bag to the sensor streamer.

22. The method of claim 19 wherein attaching further comprises mechanically coupling a first edge of the lifting bag to a second edge of the lifting bag after the lifting bag assembly is wrapped around the sensor streamer.

\* \* \* \* \*